US012760577B2

(12) United States Patent
Gildas

(10) Patent No.: US 12,760,577 B2
(45) Date of Patent: Oct. 13, 2026

(54) METHOD AND ASSEMBLY FOR PROVIDING STABILISING GUIDANCE TO A VEHICLE DOOR WITH CONNECTING ROD LOCKING

(71) Applicant: LATECOERE, Toulouse (FR)

(72) Inventor: Martin Gildas, L'Union (FR)

(73) Assignee: LATECOERE, Toulouse (FR)

( * ) Notice: Subject to any disclaimer, the term of this patent is extended or adjusted under 35 U.S.C. 154(b) by 288 days.

(21) Appl. No.: 18/262,022

(22) PCT Filed: Jan. 14, 2022

(86) PCT No.: PCT/EP2022/050783
§ 371 (c)(1),
(2) Date: Jul. 19, 2023

(87) PCT Pub. No.: WO2022/157083
PCT Pub. Date: Jul. 28, 2022

(65) Prior Publication Data
US 2024/0076923 A1 Mar. 7, 2024

(51) Int. Cl.
*B64C 1/14* (2006.01)
*E05F 7/00* (2006.01)

(52) U.S. Cl.
CPC .............. *E05F 7/005* (2013.01); *B64C 1/143* (2013.01); *B64C 1/1438* (2013.01); *E05Y 2201/638* (2013.01); *E05Y 2201/686* (2013.01); *E05Y 2900/502* (2013.01)

(58) Field of Classification Search
CPC ...... B64C 1/1423; B64C 1/143; B64C 1/1438
See application file for complete search history.

(56) References Cited

U.S. PATENT DOCUMENTS 2,751,636 A 6/1956 Boeing
2,763,900 A * 9/1956 McAfee .................. B64C 1/143 49/248
8,070,102 B2 * 12/2011 Kobayashi ............ B64C 1/1438 49/213
10,059,424 B2 * 8/2018 Steger ................... B64C 1/1438

FOREIGN PATENT DOCUMENTS

FR 3071222 3/2019
FR 3087189 4/2020
FR 3087415 4/2020

* cited by examiner

*Primary Examiner* — Richard Green
(74) *Attorney, Agent, or Firm* — Defillo & Associates, Inc.; Evelyn A. Defillo

(57) ABSTRACT

An assembly for providing stabilising guidance to a semi-plug aircraft door equipped with an opening/closing mechanism. The door frame (3) is provided with stops (7) at the front and at the rear of the door with its stops (8) bears when it is closed. A door arm (4) links the door (2) to the door frame (3). A guiding connecting rod (6), referred to as a stabilising guiding connecting rod and located on a door edge (2*h*) extending parallel to the longitudinal axis of the vehicle, is mobile, being able to move in translation at one of its ends in relation to the door in the longitudinal direction of the aircraft during the phases of disengaging and re-engaging the stops (7, 8). During the swivelling and swivelling return phases, the stabilising rod (6) is locked to the door by a lever locking mechanism (9) being actuated by a return device.

9 Claims, 11 Drawing Sheets

METHOD AND ASSEMBLY FOR PROVIDING STABILISING GUIDANCE TO A VEHICLE DOOR WITH CONNECTING ROD LOCKING

CROSS REFERENCE TO RELATED APPLICATION

This application is a national stage entry of PCT/EP2022/050783 filed Jan. 14, 2022, under the International Convention and claiming priority over French Patent Application No. FR2100591 filed Jan. 21, 2021.

TECHNICAL FIELD

The invention relates to a door stabilizing guiding method during opening/closing thereof and to a stabilizing guiding assembly using it, for vehicles for transport of persons and/or merchandise. The present invention relates more particularly to semi-plug type doors, that is to say doors able to traverse their frame during opening and closing thereof. In particular aircraft, coaches and heavy goods vehicle cabs are intended to be equipped with such doors.

In the aeronautical field stops installed on the perimeters of the door and its frame enable engagement of the door and retention thereof in its frame, these stops being all the more loaded during flight phases of the aircraft by the pressurization of the cabin. Conversely, when the aircraft is stationary on the ground the stops are disengaged in order to allow opening of the doors. The doors and their opening/closing system are designed to be simple and rapid to manipulate while avoiding damage to the structure of the aircraft—in particular its fuselage—to which they are attached.

PRIOR ART

A classic type opening kinematic consists in maintaining the door constantly parallel to the fuselage in order for it not to strike the latter in the event of emergency opening or disadvantageous meteorological conditions. The step of disengagement of the stops is therefore effected with the door kept parallel to the fuselage: to this end the door is first raised or lowered to disengage the stops, before applying a circular movement in translation to it in order to remove it from its frame, so that the door remains parallel to itself during its movement while tracing out a circular trajectory.

A major disadvantage related to this system is that the crew have to bear all the weight of the door during the phase of disengaging the stops. Improvements to facilitate this task add weight-compensating mechanisms and additional articulation arms, but these means have the consequence of significantly increasing the total weight of the door.

Another opening system described in the U.S. Pat. No. 2,751,636A enables generation of a door opening/closing kinematic that is not parallel to the fuselage. That kinematic consists in effecting a first pivoting of the door about an axis passing through its vertical median line to disengage the stops, followed by a second circular movement in translation, termed "swiveling", of the door about an axis coinciding with a vertical edge of the frame. A system of this kind, which makes it possible to dispense with the heavy mechanism and facilitates manipulation of the door, remains of great complexity of execution because it employs a combination of many connecting rods, transmission members and gears, as well as an unlocking lever situated on the frame in the vicinity of the door.

Moreover, the first pivoting to disengage the stops may be replaced by another mechanism described in the patent FR3087189, which has the advantage of being actuated at the mid-height of the door directly by means of the door arm. However, this solution remains equally complex to use.

Generally speaking, whatever the kinematic, the swiveling phase entails risks of instability that lead to difficulties in manipulating the door, lengthy opening/closing times and damage resulting from impacts of the door on the fuselage of the aircraft.

It is known that this problem of door instability during the swiveling phase has been tackled by using two guiding connecting rods mobile in rotation and placed in the upper part of the door. In this embodiment the door remains permanently parallel to the fuselage, in particular during the phase of disengaging the stops, which the invention seeks to avoid so as not to have to raise/lower the door or to increase the total weight. It is moreover necessary to use at least two guiding connecting rods in the upper part of the door because, if only one connecting rod is used, during rotation of the door arm between approximately 110° and 135° the chords of the door arm and of the connecting rod coincide and the kinematic becomes unstable.

SUMMARY OF THE INVENTION

A principal objective of the invention is to solve the problem of stability during the swiveling phase in the context of a kinematic entailing exit or entry of the door while it is not parallel to the fuselage, having the advantage of removing the constraint of vertical lifting/lowering, and then to propose a door that is easy to manipulate and represents a saving of weight.

To stabilize the door the invention uses a guiding connecting rod, also known as a stabilizing connecting rod, that connecting rod being free to move in translation on the door during the phase of disengaging the stops and being locked when the swiveling phase begins in order to guide the door and to keep it parallel to the fuselage by means of this guiding connecting rod, which is locked at this time, thus conferring on the door the required stabilization.

To be more precise the present invention has for object a method of stabilizing guiding of a semi-plug type vehicle door during opening/closing thereof, said door being arranged in a vehicle opening defining a door frame structure. This door includes front and rear parts defined relative to a longitudinal axis of the vehicle conventionally oriented between a rear and a front thereof, the vehicle defining interior and exterior spaces. The kinematics of the movements of disengagement of the door relative to its frame and of its complete opening by circular movement in translation, known as swiveling, takes place in a common horizontal plane, characterized in that it includes the following steps in door opening mode:

a phase of disengagement of the stops by a first movement of the door toward the rear and toward the interior of the vehicle by a movement in rotation and in translation, followed by a second movement of the door by rotation about its rear part, followed by inclined movement in translation toward the front and the exterior of the vehicle bringing the passage of the door parallel to its frame to the outside the vehicle, during which rotation a stabilizing connecting rod located at the door edge and extending parallel to the longitudinal axis of the vehicle and one end of which is free to move in horizontal translation parallel to a horizontal section of the door is moved;

locking of said mobile end on the door at the end of this phase of disengagement of the stops, this end then being adapted so as no longer to be able to move freely in translation while remaining articulated to the door; and stabilized guiding of the door by said stabilizing connecting rod parallel to the longitudinal axis of the vehicle during the swiveling phase.

In closing mode with a reversed kinematic the stabilizing connecting rod is kept locked during a return swiveling phase and is then free to move in horizontal translation at one of its ends relative to the door during a phase of re engagement of the stops at the beginning of which the locking of one of the ends of this stabilizing connecting rod is released, the door no longer being constrained to move in translation relative to the longitudinal axis of the vehicle, then re-entering its frame.

Apart from stabilizing the door during opening thereof, the stabilizing connecting rod advantageously does not restrict the free zone space for the door to be totally disengaged from its frame because it does not project from the volume of the arm. Even in the door closed position the stabilizing connecting rod and its locking environment do not project toward the interior of the cabin.

In some preferred embodiments:

a return means triggers locking/unlocking of the stabilizing connecting rod between two operating positions respectively corresponding to locking and unlocking the stabilizing connecting rod;

in the locking position the stabilizing connecting rod is prevented from moving in translation along the door and in an unlocking position the stabilizing connecting rod is free to move in translation along the door;

during phases of disengagement and re-engagement of the stops the return means is actuated by locking/unlocking bearing surfaces of the stabilizing connecting rod, these bearing surfaces corresponding to the two operating positions of the return means;

during the swiveling and return swiveling phases the return means is not actuated by the locking/unlocking bearing surfaces.

The invention also relates to a door stabilizing guiding assembly of an aircraft including a fuselage in which is cut at least one opening for inserting a semi-plug type door equipped with an opening/closing mechanism for executing the method as defined hereinabove if the vehicle is an aircraft. The door frame has stops at the front and at the rear, against which the door bears with its stops when it is closed. A door arm connects the door to the frame. The guiding connecting rod, also known as stabilizing connecting rod, located on a door edge extending parallel to the longitudinal axis of the vehicle is mobile in translation at one of its ends relative to the door in the longitudinal direction of the aircraft during phases of disengagement and of re-engagement of the stops. Between these phases, during swiveling and return swiveling phases, the stabilizing connecting rod is locked on the door by a locking mechanism including a lever adapted to be actuated by the return means between its two operating positions and, during phases of disengagement and of re-engagement of the stops, to remain connected to a control ramp fastened to the door frame and including the locking/unlocking bearing surfaces.

In accordance with some preferred embodiments:

the locking/unlocking mechanism is located on a median zone at the edge at the top of the door;

the locking/unlocking mechanism of the stabilizing connecting rod consists of at least two devices, a first device fastened to the door and a second device fastened to the door frame, the first device including a lever articulated on a shaft and a lever support provided with a slideway in which the mobile end of the stabilizing connecting rod is able to move in horizontal translation relative to the door, and the second device including the control ramp as well as a ramp accompanying the first device during the phases of disengagement/re-engagement of the stops of the door, these two ramps being adjacent to one another and positioned in horizontal plane;

the lever has at one end an opening which, in the locking position, is engaged on the stabilizing connecting rod in order to prevent it moving in translation along the door and which, in the unlocking position, is adapted to free the stabilizing connecting rod to move in translation along the door, and at its other end a finger that during the phases of disengagement and re-engagement of the stops maintains the contact of the stabilizing connecting rod on the control ramp;

the return means is a torsion spring wound around the shaft of the lever and arranged so that it positions the lever in the locking position when it is released;

the control ramp is disposed and sized so that at the end of the phase of disengagement of the stops the lever goes to the position locking the stabilizing connecting rod and, at the start of the phase of re-engagement of the stops the lever goes to the position unlocking the stabilizing connecting rod;

the bearing surfaces of the control ramp consist of first and second horizontal and parallel bearing surfaces arranged so that when the door is in the closed position the first bearing surface makes contact with the finger of the lever and when the door arrives at the end of the phase of disengagement of the stops or at the start of the phase of re-engagement of the stops the second bearing surface makes contact with the lever finger, placing the lever in the position locking the stabilizing connecting rod;

the two control bearing surfaces are interconnected by a surface defining a transition slope.

By a phase of disengaging the stops is meant a set of steps that begin with the separation of the frame and door stops, continuing to the door leaving its frame and finishing when the door is again parallel to the fuselage. Similarly, the phase of re-engagement of the stops begins at the end of the return swiveling phase when the door is no longer parallel to the fuselage and is about to re-enter its door frame, to finish when the frame and door stops are in contact on either side of the front and the rear of the frame.

In the present text the qualifier "horizontal" when referring to a plane extent means that that extent is parallel to the ground on which the vehicle stands, in particular on which an aircraft stands when taxiing or stationary. The qualifier "above" when referring to one plane extent relative to another means that said extent is situated at a height greater than the other relative to said ground.

DESCRIPTION OF THE FIGURES

Other features and advantages of the present invention will emerge from the following detailed description of one embodiment without limiting the scope thereof, given with reference to the appended figures that respectively represent.

DETAILED DESCRIPTION

Figure 1:
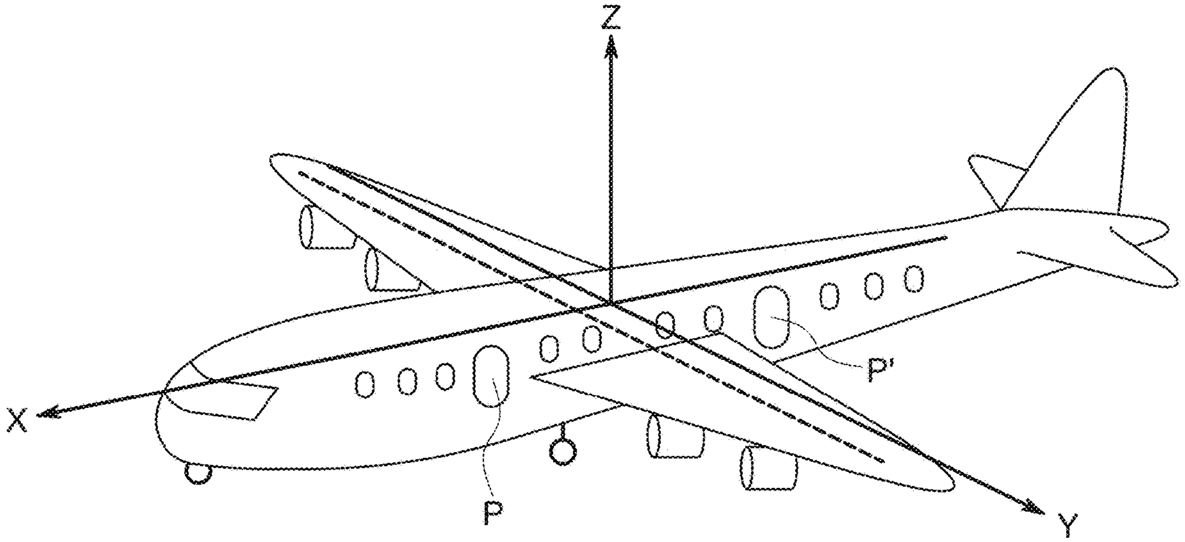
FIG. 1 shows a perspective view of an aircraft with its conventional system of axes.

Referring to the FIG. 1 general view, an aircraft 1 and its conventional direction system of axes (X, Y, Z) are represented in order to define the various directions referred to: the axis X in the longitudinal direction of the aircraft 1, the axis Y perpendicular to the axis X and defining a plane XY parallel to the ground on which the aircraft stands, and the axis Z completing the forward system of axes. The fuselage 10 of this aircraft 1 has in particular two passenger door openings P, P' on a common face of the fuselage 10*a*.

Figure 2:
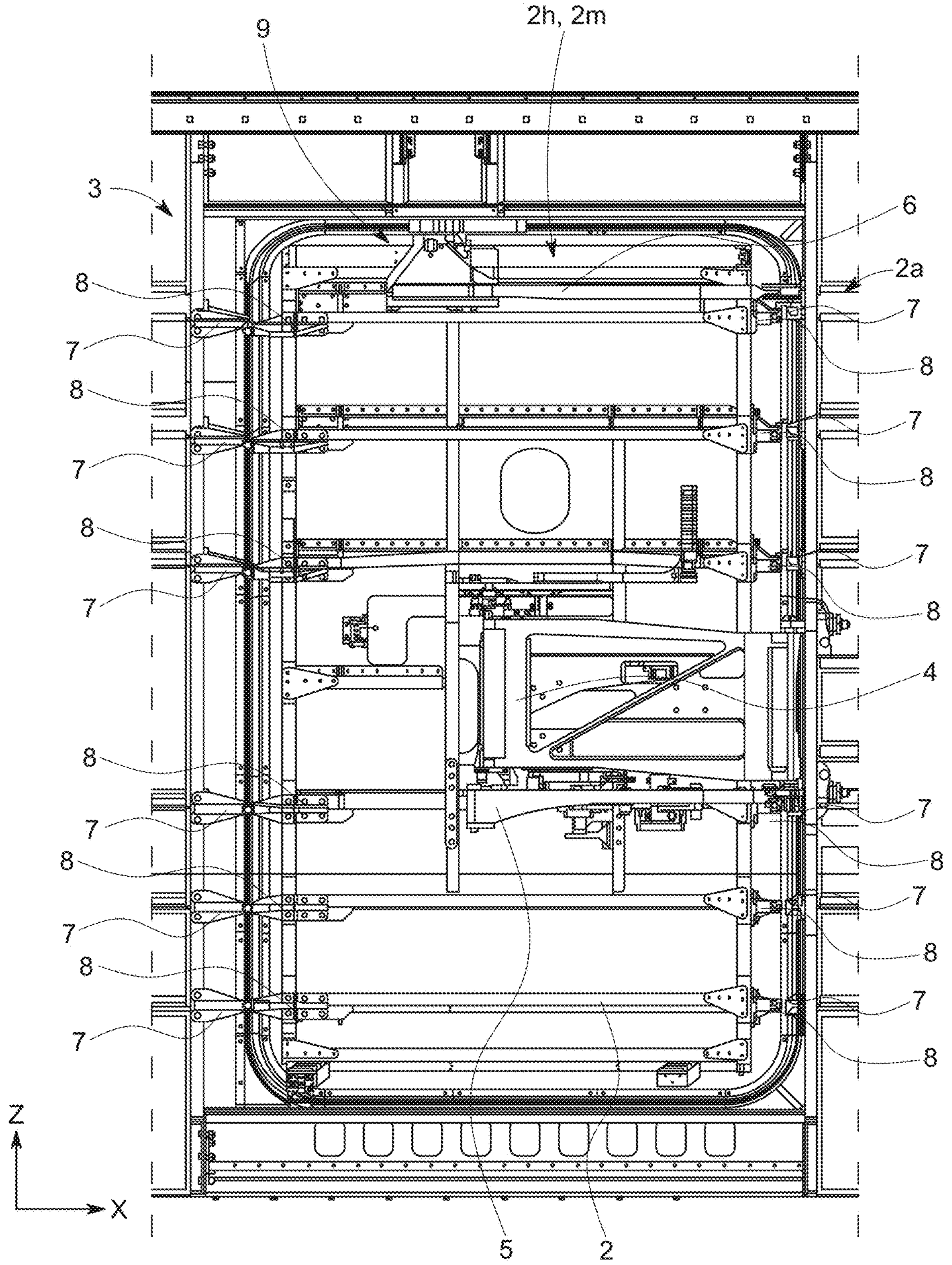
FIG. 2 shows a front view of an aircraft door in its flush closed position.

FIG. 2 shows more precisely a semi-plug type door 2 in its frame 3 in a closed configuration. In this embodiment the door 2 is articulated relative to its frame 3 by means of a door arm 4 and two connecting rods (5, 6), a connecting rod 5 that participates in controlling the door in combination with and in the vicinity of the arm 4 and a stabilizing connecting rod 6 disposed at the top edge 2*h* of the door 2. This stabilizing connecting rod 6 is mobile:

- in rotation relative to the frame 3, and
- in rotation and in longitudinal translation between the front and the rear of the door, as defined relative to the longitudinal axis (X) of the aircraft 1, the front of the door being the vertical door edge 2*a* situated at the front.

In this closed configuration the frame stops 7 and the door stops 8 are interengaged at twelve points of contact, six of which are at the front and six at the rear.

Figure 3:
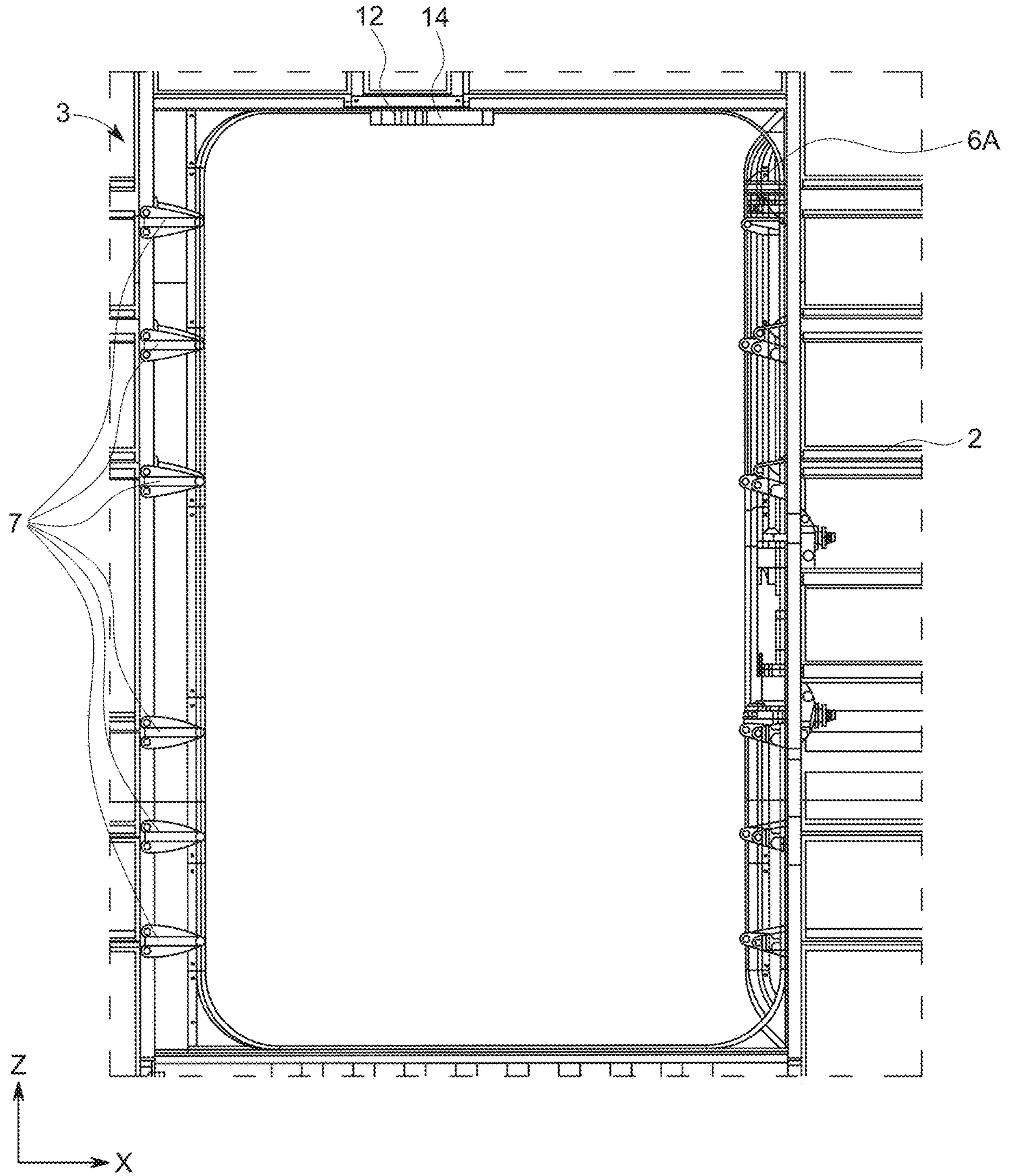
FIG. 3 shows a front view of an aircraft door in its open position.

FIG. 3 depicts the door 2 in its open configuration and the elements that are fastened to the door frame 3, namely: the frame stops 7, the attachment 6A of the upper guiding connecting rod 6 to the frame 3, and the guide ramp 12 and the control ramp 14 of the system 9 for locking/unlocking the guiding connecting rod 6.

The locking mechanism of the upper guiding connecting rod 9 is installed in the median zone 2*m* of the top of the door.

FIGS. 4*a* to 4*g* show a view from below of the locking/unlocking mechanism 9 of the stabilizing guiding connecting rod 6 during the kinematic of disengagement of the frame stops 7 and the door stops 8 in the various subsequent phases.

Figure 4A:
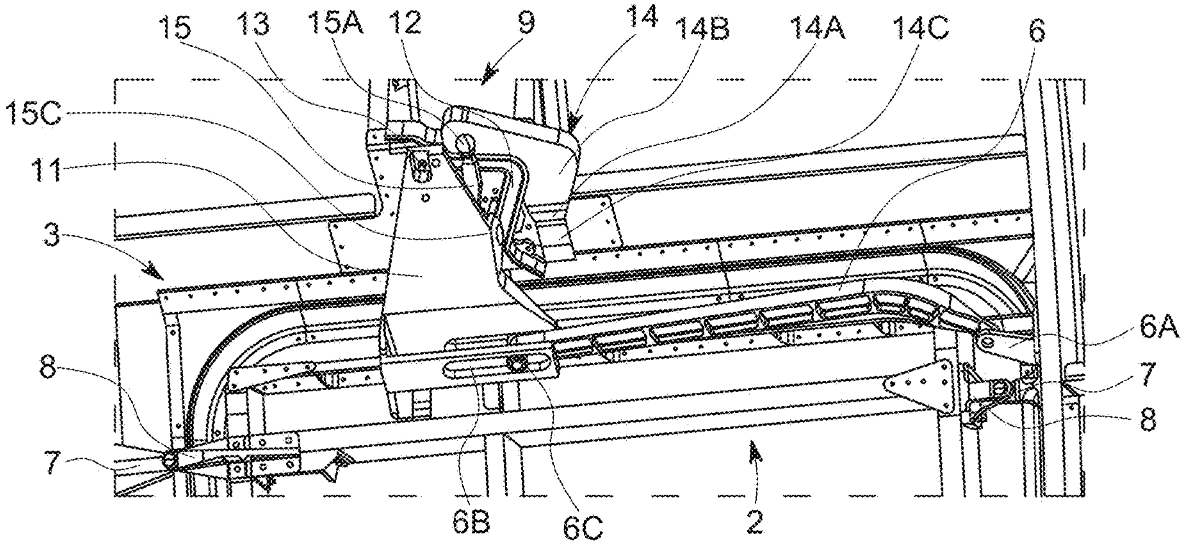
FIG. 4*a* shows a perspective view of the kinematic of disengagement of the door stops at the level of the stabilizing connecting rod located in the upper part of the door.

FIG. 4*a* shows first the position of the upper guiding connecting rod 6 and that of its shaft 6C mobile in translation in its slideway 6B relative to the door 2 when the latter is in the closed position. The frame stops 7 and the door stops 8 are interengaged on each side of the door 2. The locking/unlocking mechanism 9 includes two devices, the first consisting of a lever 15 and a lever support 11 and the second consisting of an accompanying ramp 12 and a control ramp 14.

The accompanying ramp 12 and the control ramp 14 are adjacent to one another and fastened to the door frame 3. The lever support 11 is fixed to the top edge 2*h* of the door 2. This support 11 consists of a triangular plate having at its base a slideway 6B enabling movement in translation of the stabilizing guiding connecting rod 6 and a horizontal shaft 15C about which a torsion spring 16 is wound (cf. FIG. 6*a* or 6*b*).

The lever 15 is fastened to the torsion spring 16 so that this lever 15 pivots about this return spring 16 and the horizontal shaft 15C of the lever support 11, defining two operating positions: a locking position and an unlocking position of the stabilizing connecting rod 6. Moreover, the lever 15 has at one of its ends a finger 15A making contact with the control ramp 14 and at its other end an opening 15B (cf. FIG. 6*a* or 6*b*) which, when it is engaged on the shaft 6C mobile in translation of the stabilizing guiding connecting rod 6, causes immobilization of said movement in translation.

As for the control ramp 14, its function is to activate or to deactivate locking of the mobile stabilizing guiding connecting rod 6 by blocking movement in translation of said connecting rod. To this end the control ramp 14 has two parallel horizontal bearing surfaces (14B, 14C) connected by a transition slope 14A. A first bearing surface 14B is positioned at a height such that when the finger 15A of the lever is in contact with it the torsion spring 16 maintains the contact placing the lever 15 in the unlocking position. The stabilizing connecting link 6 is then unlocked and free to move in translation.

The finger 15A of the lever moves on this first bearing surface 14B during the start of the phase of disengagement of the stops (7, 8) until it reaches the transition slope 14A: this phase of disengagement of the stops (7, 8) taking place in a horizontal plane, the torsion spring 16 maintaining constant contact between the finger 15A of the lever and the transition slope 14A until it reaches the second bearing surface 14C, positioned at a greater height than the first bearing surface. Under these conditions, when the lever finger 15A comes into contact the torsion spring 16 then holds the other end 15B of the lever in the position locking the mobile shaft 6C of the stabilizing connecting rod 6.

In fact, when, acted on by the torsion spring 16, the finger 15A of the lever slides on the transition slope 14A from one bearing surface to the other the lever 15 pivots about its shaft 15C. At the end of the second bearing surface 14C the finger 15A of the lever is no longer in contact and the torsion spring 16 keeps the mobile shaft 6C of the stabilizing connecting rod 6 locked during the rest of opening the door.

During the return phase of re-engaging the stops (7, 8) the reverse process is observed: initially the finger 15A of the lever is free and the mobile shaft 6C of the stabilizing connecting rod 6 is locked, after which the finger 15A of the lever comes into contact with the second bearing surface 14C until it reaches the transition slope 14A. Contact with this slope being maintained, the lever 15 is going to pivot about the shaft 15C and release the mobile shaft 6C of the stabilizing connecting rod 6 when the finger 15A of the lever reaches the first bearing surface 14B: the stabilizing connecting rod 6 being mobile again, the door closing kinematic may be carried out.

Figure 4B:
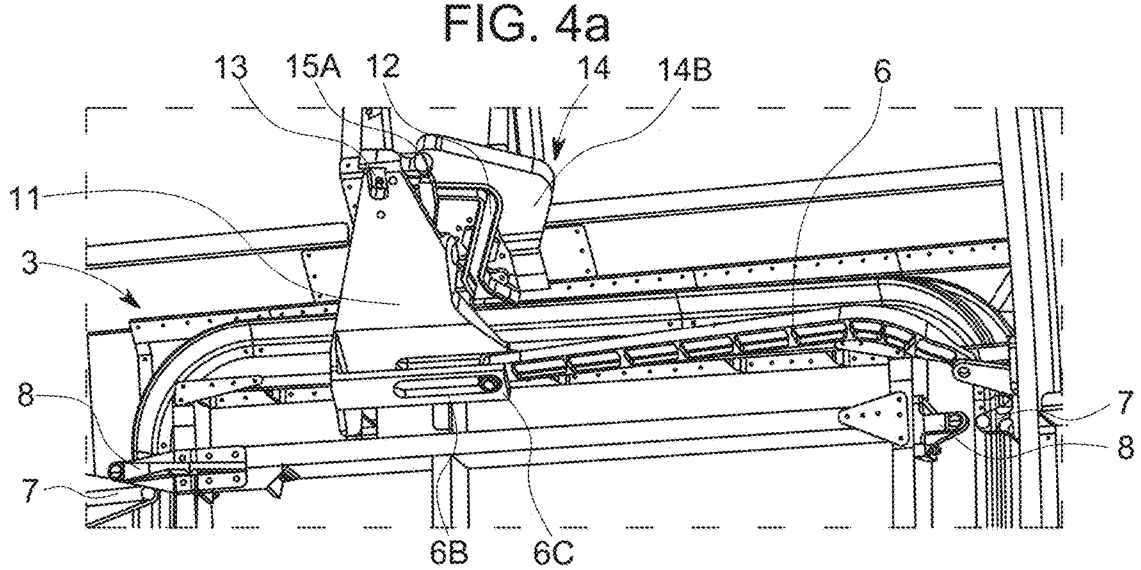
FIG. 4*b* shows another perspective view of the kinematic of disengagement of the door stops at the level of the stabilizing connecting rod located in the upper part of the door.

FIG. 4*b* shows the beginning of the phase of opening the door 2 with in particular separation of the door stops 8 and the frame stops 7. The guide ramp 12 allows the lever support 11 to follow the kinematic of disengagement/re-engagement of the stops by way of its guide rod 13.

In the aforementioned kinematic the door 2 has performed a movement in translation toward the rear and toward the interior of the cabin in the initiation of the first step of the process. The accompanying ramp 12 is particularly suited to this start of the kinematic in order not to impede the movement of the door 2. Consequently, the stabilizing connecting rod 6 is moved in translation toward the front of the door 2 in its slideway 6B.

Figure 4C:
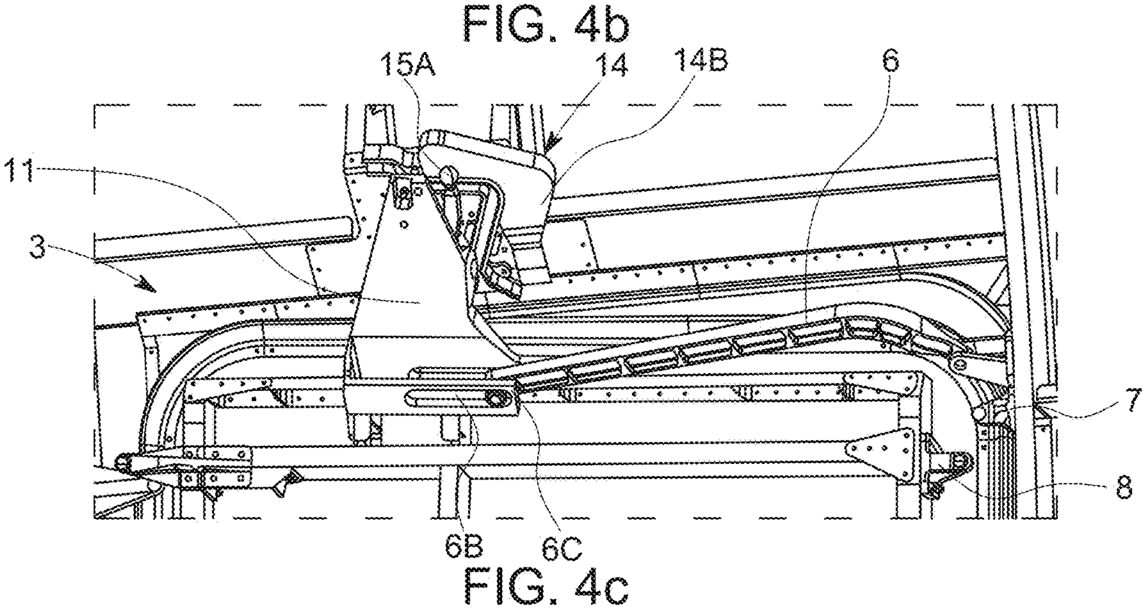
FIG. 4*c* shows another perspective view of the kinematic of disengagement of the door stops at the level of the stabilizing connecting rod located in the upper part of the door.
Figure 4D:
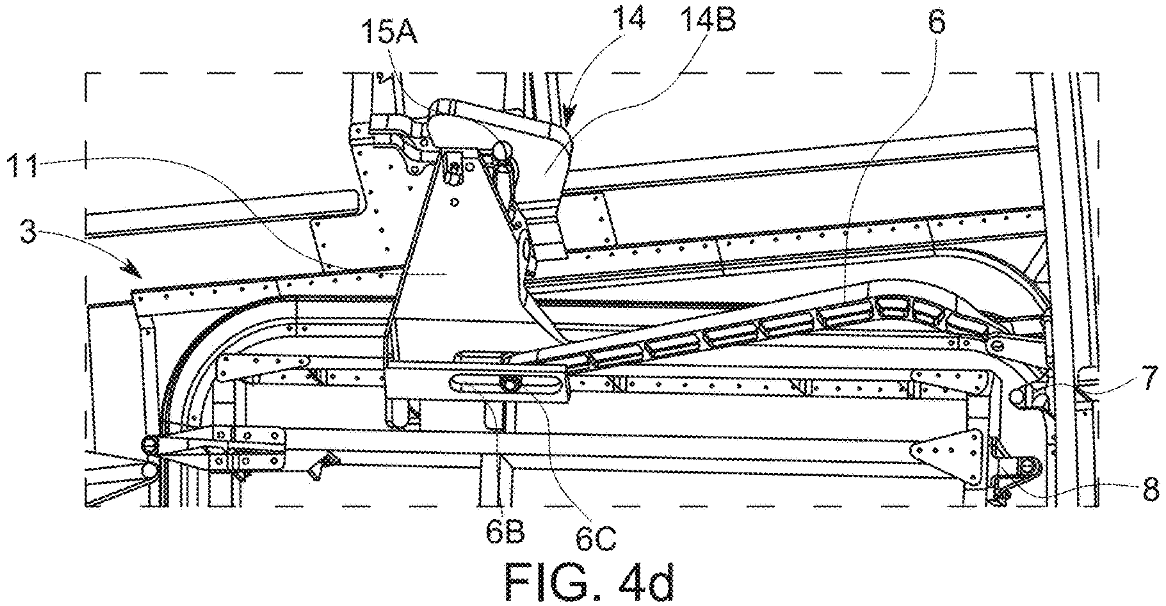
FIG. 4*d* shows another perspective view of the kinematic of disengagement of the door stops at the level of the stabilizing connecting rod located in the upper part of the door.
Figure 4E:
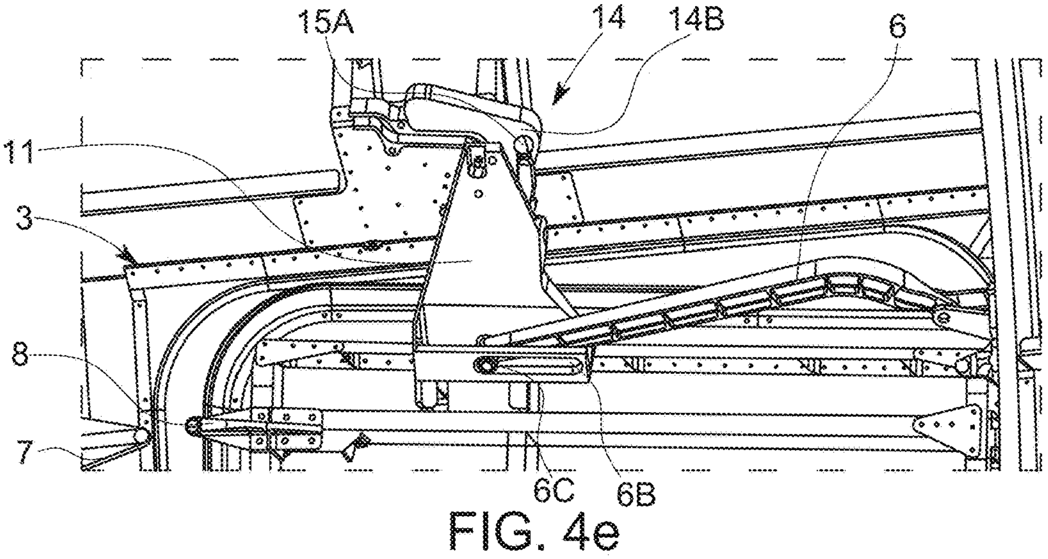
FIG. 4*e* shows another perspective view of the kinematic of disengagement of the door stops at the level of the stabilizing connecting rod located in the upper part of the door.

FIGS. 4*c*, 4*d* and 4*e* show in detail the disengagement of the door 2 as far its complete deployment parallel to the frame 3 on the outside of the fuselage achieved by a movement in rotation of the door about its rear part and then by a movement in translation inclined toward the front and the outside. During this first step of the process the finger 15A of the lever remains in contact with the first bearing surface 14B of the control ramp 14: the locking system remains deactivated and the stabilizing connecting rod 6 retains its mobility in translation during these steps and travels the whole of the slideway 6B.

Figure 4F:
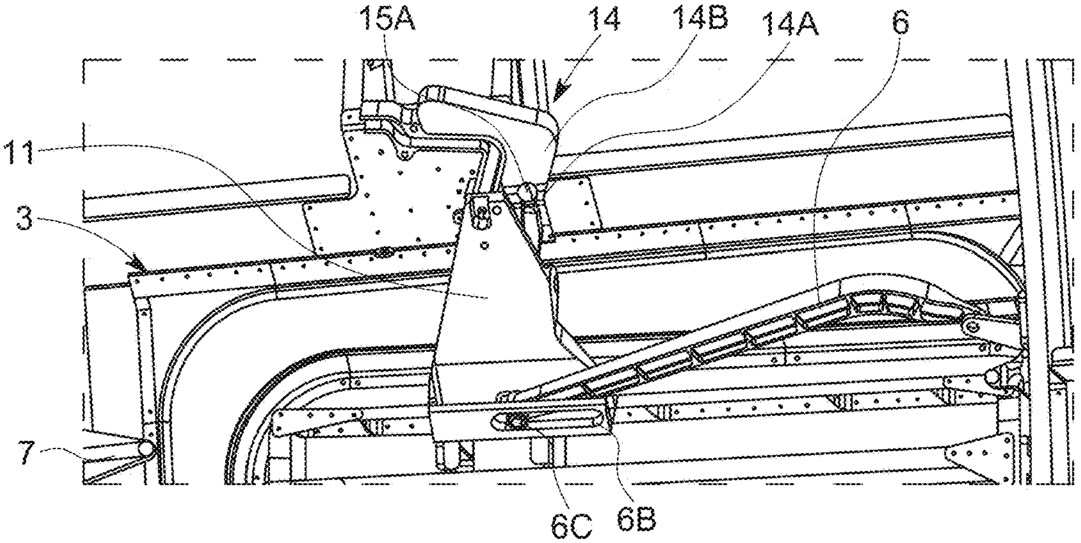
FIG. 4*f* shows another perspective view of the kinematic of disengagement of the door stops at the level of the stabilizing connecting rod located in the upper part of the door.

FIG. 4*f* depicts the finger 15A of the lever at the entry of the transition slope 14A of the control ramp 14: the torsion spring 16 being configured so that the finger 15A of the lever is permanently in contact with the control ramp 14 for as long as the latter is accessible, the change of slope leads to activation of the mechanism for locking the mobile shaft 6C of the stabilizing connecting rod 6.

Figure 4G:
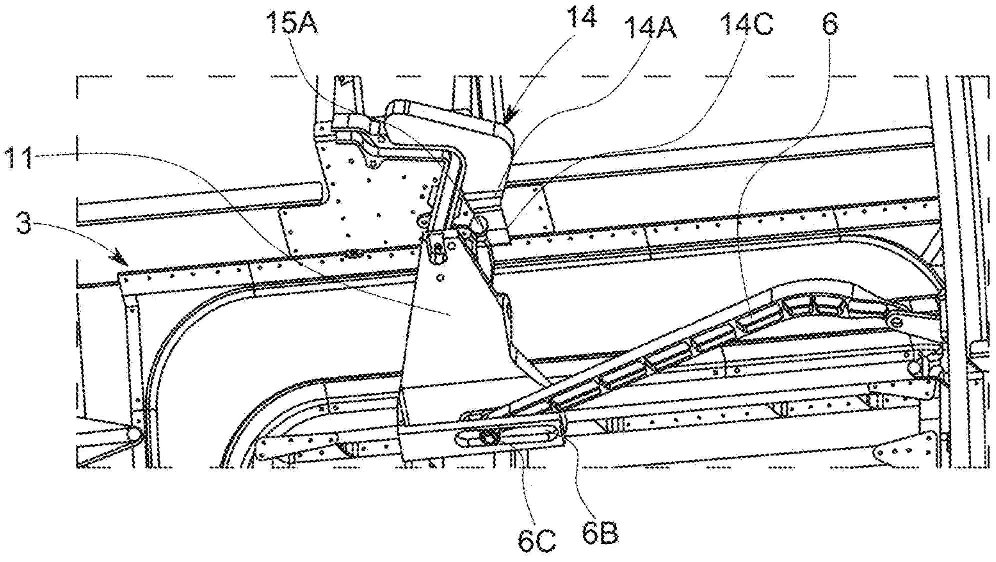
FIG. 4*g* shows another perspective view of the kinematic of disengagement of the door stops at the level of the stabilizing connecting rod located in the upper part of the door.

In FIG. 4*g* the finger 15A of the lever is on the second bearing surface 14C of the control ramp 14 and the stabilizing connecting rod 6 is prevented from moving in translation relative to the door 2 by the locking of the mobile shaft 6C in the second step of the process.

Figure 5A:
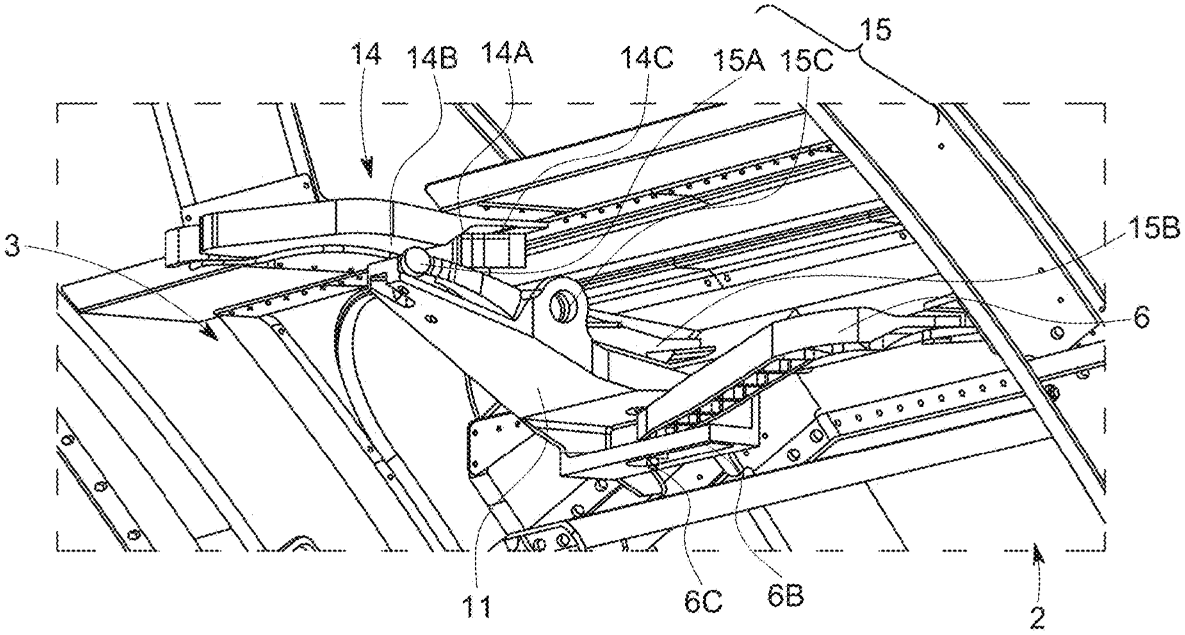
FIG. 5*a* shows a perspective view of the control ramp acting on the locking lever.
Figure 5B:
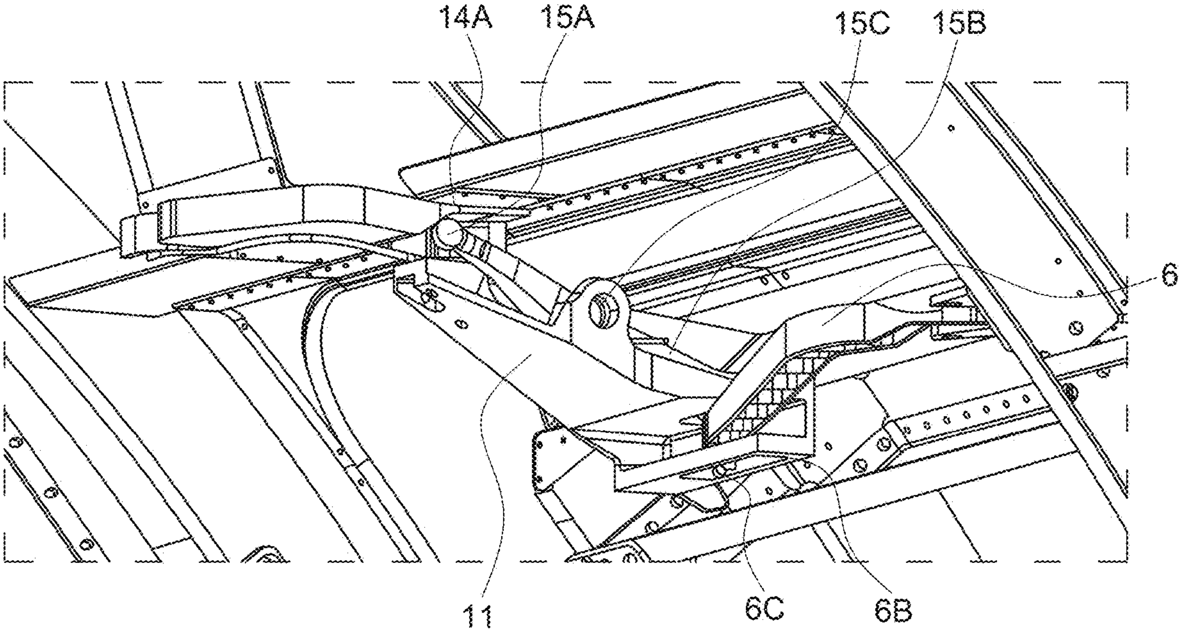
FIG. 5*b* shows another perspective view of the control ramp acting on the locking lever.

FIGS. 5*a* and 5*b* represent a perspective view of the locking mechanism 9 and more particularly the lever 15 during activation of locking of the mobile shaft 6C of the stabilizing connecting rod 6. In FIG. 5*a* the finger 15A of the lever is still on the first bearing surface 14B, the other end 15B of the lever 15 is raised and the stabilizing connecting rod 6 is mobile in translation in the first step of the process. In FIG. 5*b* the finger 15A of the lever, acted on by the torsion spring 16, maintains the contact with the control ramp 14. The transition slope 14A of the control ramp 14 then causes a change of position of the lever 15, which swivels on its shaft 15C and engages with the mobile shaft 6C of the stabilizing connecting rod 6 in order to lock movement in translation thereof in the second step of the process.

Figure 6A:
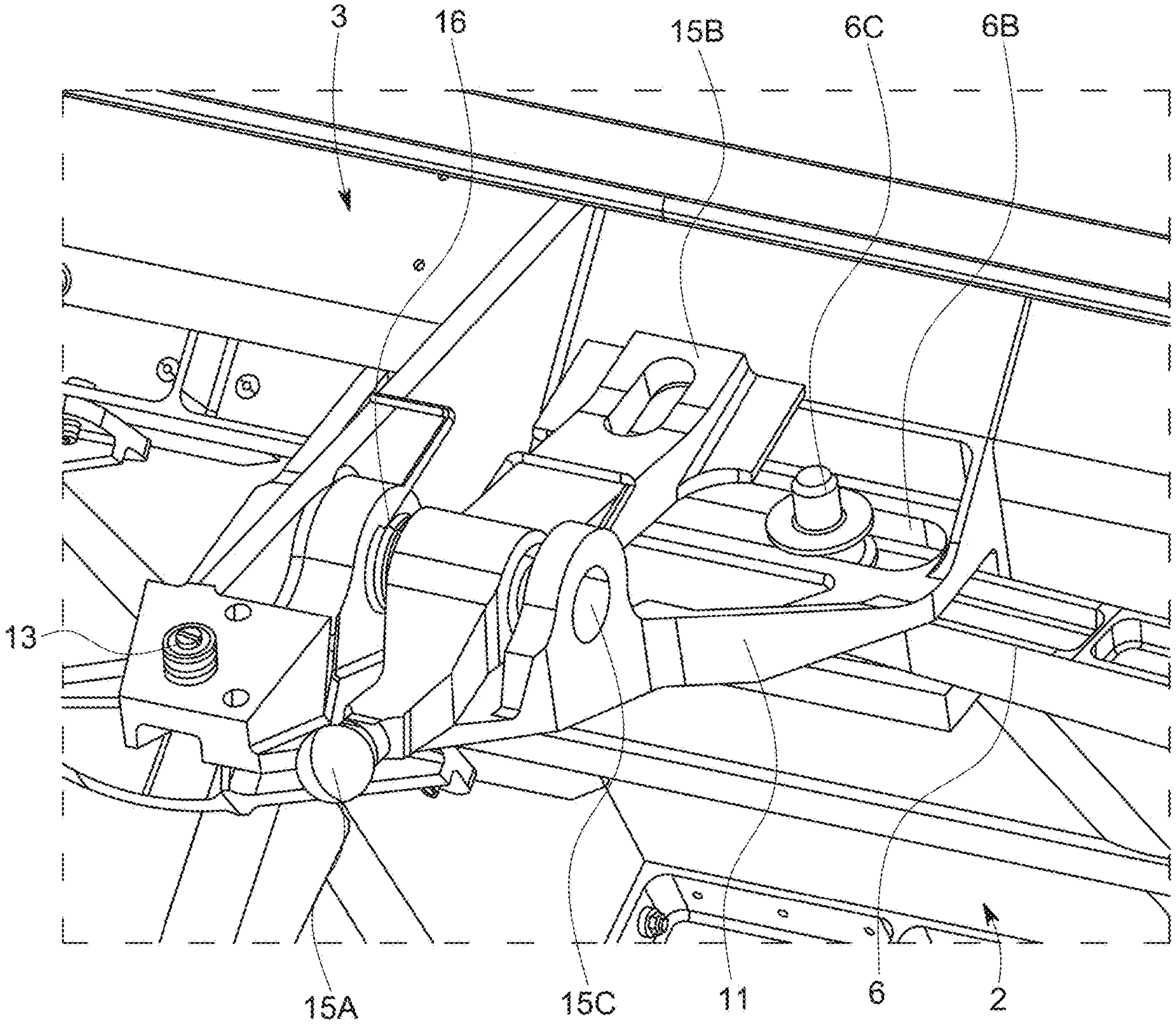
FIG. 6*a* shows a perspective view of the locking lever in the unlocked position.
Figure 6B:
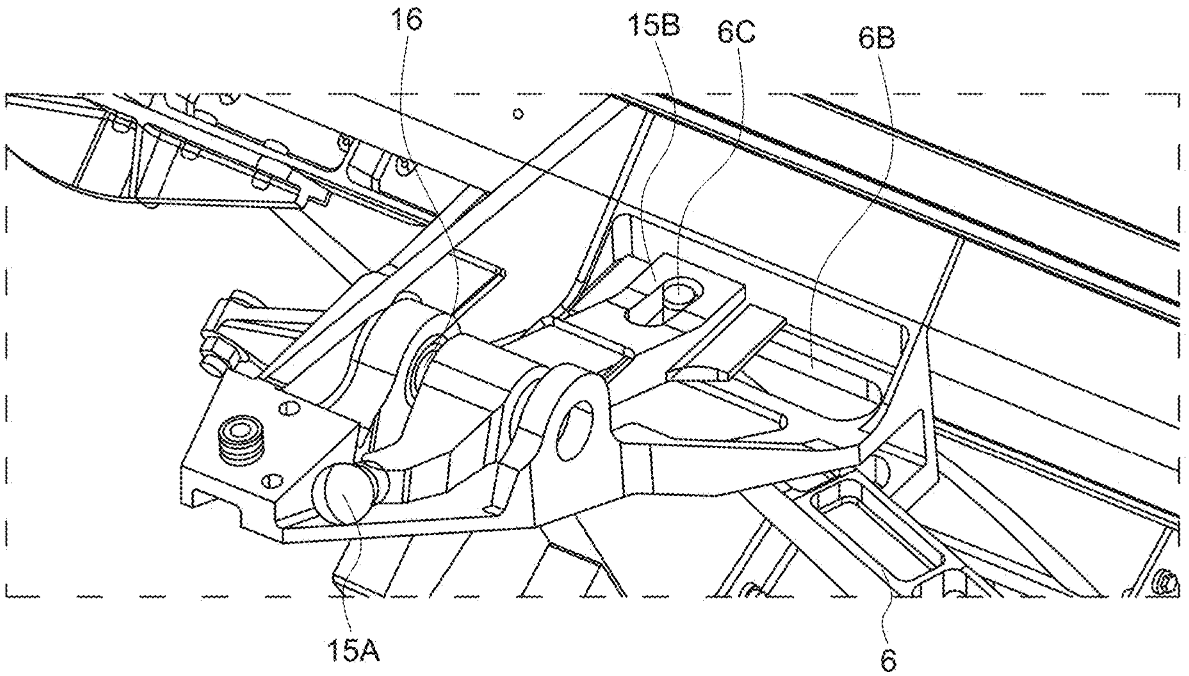
FIG. 6*b* shows a perspective view of the locking lever in the locked position.

FIGS. 6*a* and 6*b* depict views from above of the lever 15 in the locking and unlocking positions:

- in FIG. 6*a* the mobile shaft 6C of the stabilizing connecting rod 6 is free and is able to move in translation in its slideway 6B relative to the door 2 in the first step of the process, and
- in FIG. 6*b* the other end 15B of the lever 15 has come to engage the mobile shaft 6C of the stabilizing connecting rod 6, thus rendering it immobile and locking movement in translation of the stabilizing connecting rod 6 in the second step of the process.

Figure 7A:
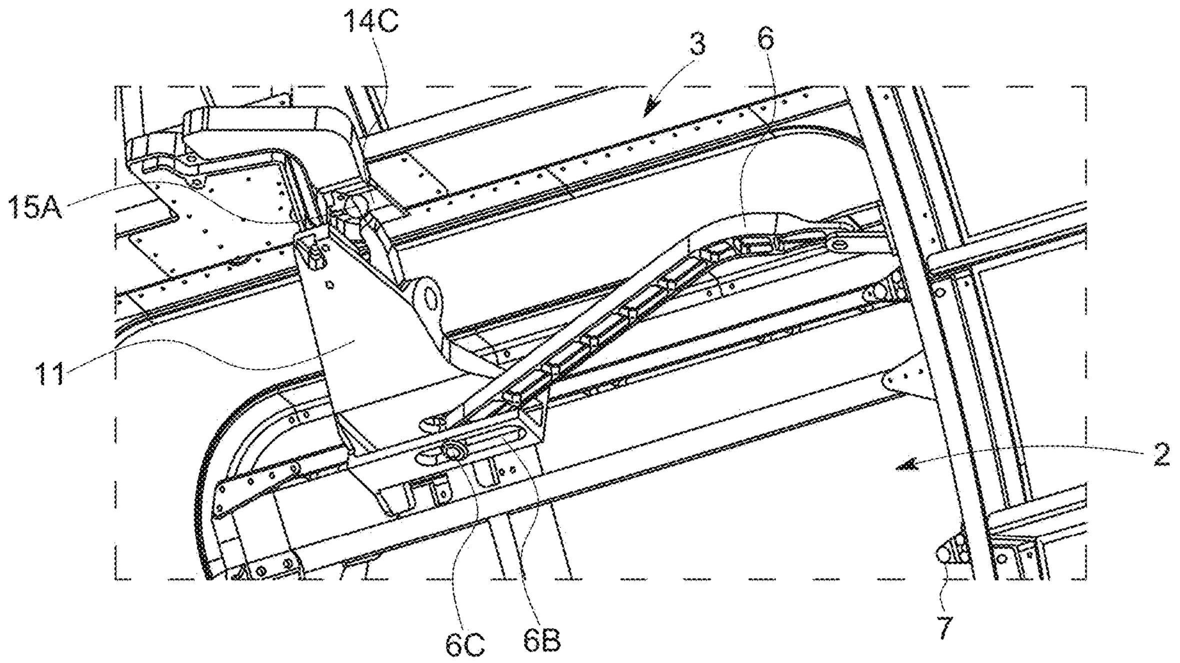
FIG. 7*a* shows a perspective view of a position of the door and the stabilizing connecting rod during the swiveling phase.
Figure 7B:
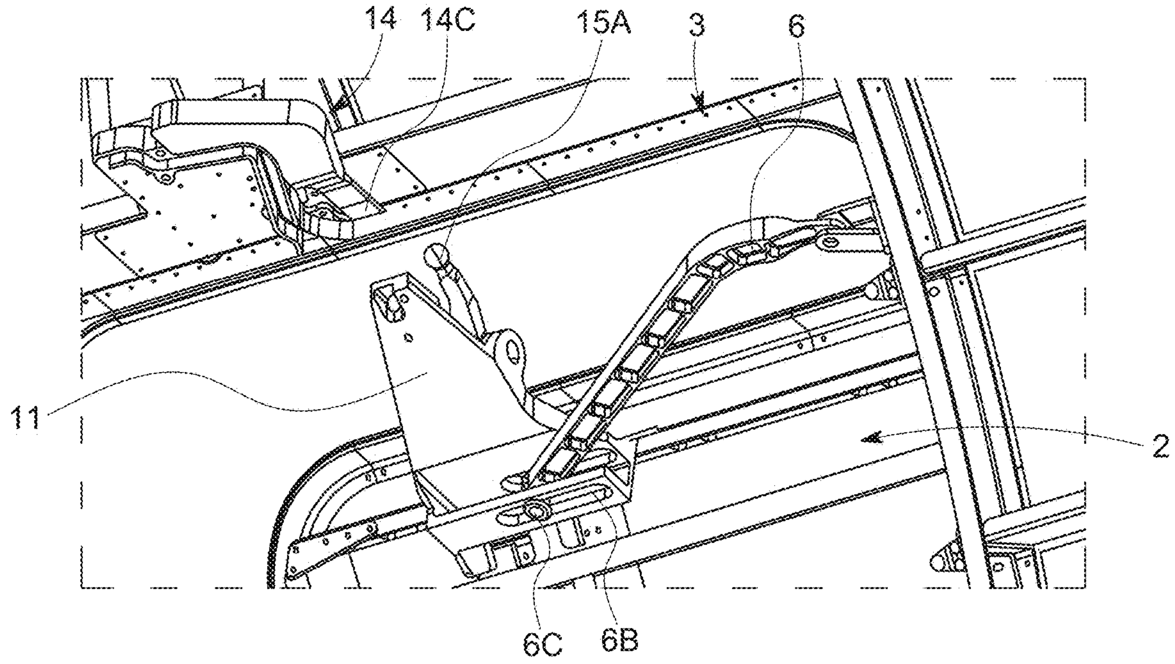
FIG. 7*b* shows a perspective view of another position of the door and the stabilizing connecting rod during the swiveling phase.
Figure 7C:
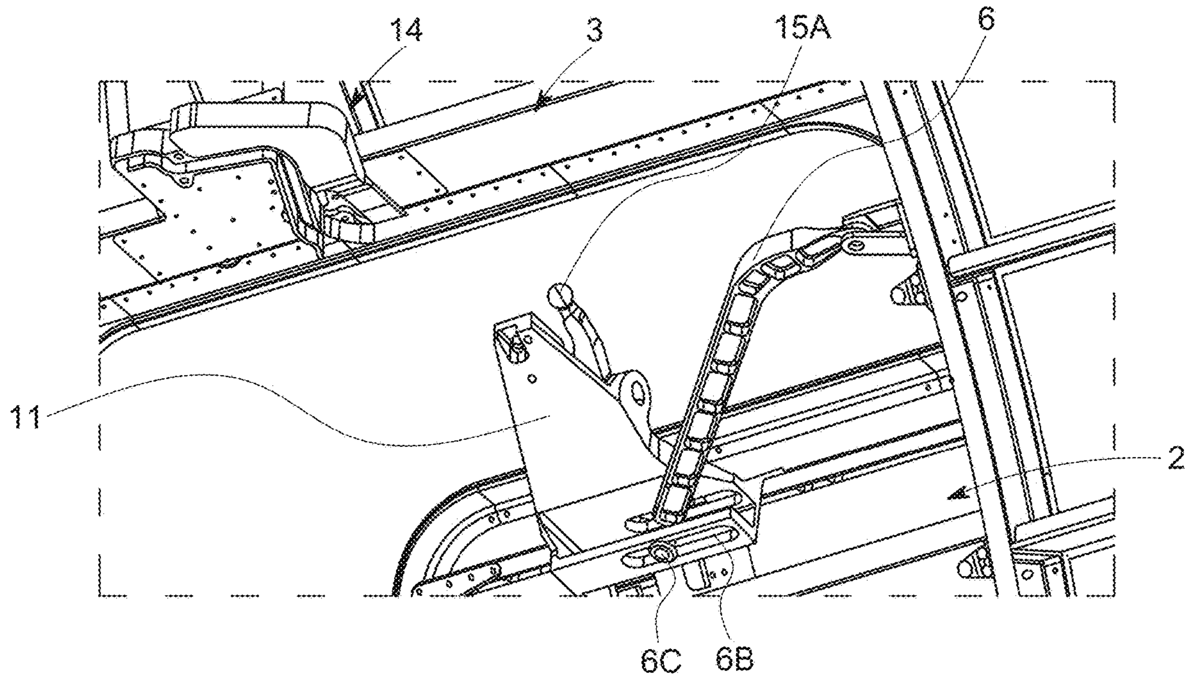
FIG. 7*c* shows a perspective view of another position of the door and the stabilizing connecting rod during the swiveling phase.

FIGS. 7*a*, 7*b* and 7*c* show the initiation of the step of swiveling the door. In FIG. 7*a* the finger 15A of the lever is in contact with the second bearing surface 14C of the control ramp 14, which has caused the stabilizing connecting rod 6 to be locked. In FIGS. 7*b* and 7*c* the door 2 opens progressively and the lever 15 is no longer in contact with the control ramp 14. The stabilizing connecting rod 6 is prevented from moving in translation and thus exercises a stabilization function with respect to the door 2 when it is opened in the third step of the process.

The invention is not limited to the embodiments described and represented. Thus the accompanying ramp 12 of the locking/unlocking mechanism may be eccentric relative to the median zone of the door and thus dissociated from the control ramp. Moreover, the door may feature a plurality of ramps to accompany its opening/closing kinematic: it is then possible to use one of them to constitute this accompanying ramp 12 of the locking/unlocking mechanism and to associate it with the control ramp 14.

Moreover, the stabilizing connecting rod could be fixed to the door and fixed against movement in translation at the level of its attachment to the door frame: the locking mechanism is then offset on the door frame. Finally, the invention applies to any vehicle a door of which is of the semi-plug type and moves in translation during opening/closing thereof.

The invention claimed is:

1. A method of stabilizing guiding of a semi-plug type vehicle door during opening/closing thereof, said door (2) being arranged in a vehicle opening (P, P') defining a door frame structure (3) including front and rear parts defined relative to a longitudinal axis (axis X) of the vehicle conventionally oriented between a rear and a front of the vehicle, the vehicle defining an interior space and an exterior space, the method comprising the following steps:

- disengaging the door (2) relative to the door frame structure (3);
- opening the or completely by a swiveling movement;
- disengaging stops (7, 8) by first moving the door (2) toward the rear part and toward the interior space of the vehicle by using a rotation movement and a translation movement;
- moving the door (2) by a second rotation movement towards the rear part;
- inclining moving the door (2) toward the front part and the exterior of the vehicle bringing the door (2) outside the vehicle, parallel to the door frame structure, during which rotation a stabilizing connecting rod (6) located at a door edge (2_h_) and extending parallel to the longitudinal axis of the vehicle one mobile end (6_c_) of which is free to move in horizontal translation parallel to a horizontal section of the door (2);

locking of said mobile end (6_c_) on the door (2) at the end of the phase of disengagement of the stops, the mobile end (6_c_) then being adapted so as to no longer be able to move freely in translation while remaining articulated to the door (2); and stabilized guiding of the door (2) by said stabilizing connecting rod (6) parallel to the longitudinal axis of the vehicle during a swiveling phase;

and in closing mode in accordance with a reversed kinematic:

wherein during a return swiveling phase, the stabilizing connecting rod (6) remains locked, stabilizing the guiding of the door (2);

wherein during a release phase, one end (6_c_) of the stabilizing connecting rod (6) is released and free to move in horizontal translation relative to the door (2);

a phase of re-engagement of the stops (7, 8), wherein the stabilizing connecting rod (6) located on a door edge (2_h_) extending parallel to the longitudinal axis of the vehicle is mobile in translation at one of its ends (6C) relative to the door in the longitudinal direction of the aircraft during phases of disengagement and of re-engagement of the stops (7, 8) and is locked on the door (2) during swiveling and return swiveling phases by a locking/unlocking mechanism (9) including a lever (15) adapted to be actuated by a return device (16) between two operating positions and, during phases of disengagement and of re-engagement of the stops (7, 8), to remain connected to a control ramp (14) fastened to the door frame (3) and including the locking/unlocking bearing surfaces (14_b_, 14C);

wherein the locking/unlocking mechanism (9) is located on a median zone (2_m_) at the edge (2_h_) at the top of the door;

wherein the locking/unlocking mechanism (9) of the stabilizing connecting rod (6) includes:

a first device (11, 15) fastened to the door (2) and a second device (12, 14) fastened to the door frame (3); the first device (11, 15) including a lever (15) articulated on a shaft (15C) and a lever support (11) provided with a slideway (6B) in which the mobile end (6C) of the stabilizing connecting rod (6) is able to move in horizontal translation relative to the door (2);

the second device (12, 14) including the control ramp (14) as well as an accompanying ramp (12) of the first device (11, 15) during the phases of disengagement/re-engagement of the stops (7, 8) of the door (2), the two ramps (12, 14) being adjacent to one another and positioned in horizontal plane; and wherein the lever (15) has at one end (15B) an opening which, in the locking position, is engaged on the stabilizing connecting rod (6) in order to prevent it moving in translation along the door (2) and which, in the unlocking position, is adapted to free the stabilizing connecting rod (6) to move in translation along the door (2), and at its other end a finger (15A) that during the phases of disengagement and re-engagement of the stops (7, 8) maintains the contact of the stabilizing connecting rod (6) on the control ramp (14).

2. The door stabilizing guiding method as claimed in claim 1, wherein a return device (16) triggers locking/unlocking of the stabilizing connecting rod (6) between two operating positions respectively corresponding to locking and unlocking the stabilizing connecting rod (6).

3. The door stabilizing guiding method as claimed in claim 2, wherein in the locking position the stabilizing connecting rod (6) is prevented from moving in translation along the door (2) and in an unlocking position the stabilizing connecting rod (6) is free to move in translation along the door (2).

4. The door stabilizing guiding method as claimed in claim 3, wherein, in the phases of disengagement and re-engagement of the stops (7, 8), the return device (16) is actuated by locking/unlocking bearing surfaces (14_b_, 14C) of the control ramp (14).

5. The door stabilizing guiding method as claimed in claim 4, wherein during swiveling and return swiveling phases the return device (16) is not actuated by the locking/unlocking bearing surfaces (14B, 14C).

6. An aircraft door stabilizing guiding assembly of an aircraft including a fuselage in which is cut at least one semi-plug type door opening equipped with an opening/closing mechanism for executing the method as claimed in claim 1, wherein the stabilizing connecting rod (6) located on a door edge (2_h_) extending parallel to the longitudinal axis of the vehicle is mobile in translation at one of its ends (6C) relative to the door in the longitudinal direction of the aircraft during phases of disengagement and of re-engagement of the stops (7, 8) and is locked on the door (2) during swiveling and return swiveling phases by a locking mechanism (9) including a lever (15) adapted to be actuated by the return device (16) between two operating positions and, during phases of disengagement and of re-engagement of the stops (7, 8), to remain connected to a control ramp (14) fastened to the door frame (3) and including the locking/unlocking bearing surfaces (14_b_, 14C);

wherein the bearing surfaces of the control ramp (14) include a first and a second horizontal and parallel bearing surfaces (14B, 14C) arranged so that when the door (2) is in the closed position, the first bearing surface (14B) makes contact with a finger of the lever (15A) and when the door (2) arrives at the end of the phase of disengagement of the stops (7, 8) or at the start of the phase of re-engagement of the stops (7, 8), the second bearing surface (14C) makes contact with the lever finger (15A).

7. The aircraft door stabilizing guiding assembly as claimed in claim 6, wherein the return device (16) is a torsion spring wound around a shaft (15C) of the lever (15) and arranged so that it positions the lever (15) in the locking position when released.

8. The aircraft door stabilizing guiding assembly as claimed in claim 6, wherein the control ramp (14) is disposed and sized so that at the end of the phase of disengagement of the stops (7, 8), the lever (15) goes to the position locking the stabilizing connecting rod (6) and, at the start of the phase of re-engagement of the stops (7, 8), the lever goes to the position unlocking the stabilizing connecting rod (6).

9. The aircraft door stabilizing guiding assembly as claimed in claim 6, wherein the two control bearing surfaces (14B, 14C) are interconnected by a surface defining a transition slope (14A).

* * * * *